US009787554B2

(12) United States Patent
Kohzeki et al.

(10) Patent No.: US 9,787,554 B2
(45) Date of Patent: Oct. 10, 2017

(54) INFORMATION-PROCESSING APPARATUS AND OUTPUT ADJUSTMENT METHOD

(71) Applicant: PFU Limited, Ishikawa (JP)

(72) Inventors: Kenji Kohzeki, Ishikawa (JP); Keisuke Kidoguchi, Ishikawa (JP)

(73) Assignee: PFU LIMITED, Ishikawa (JP)

( * ) Notice: Subject to any disclaimer, the term of this patent is extended or adjusted under 35 U.S.C. 154(b) by 487 days.

(21) Appl. No.: 14/314,958

(22) Filed: Jun. 25, 2014

(65) Prior Publication Data
US 2015/0277482 A1 Oct. 1, 2015

(30) Foreign Application Priority Data

Mar. 28, 2014 (JP) .................. 2014-069690

(51) Int. Cl.
G06F 15/16 (2006.01)
H04L 12/26 (2006.01)
G06F 1/32 (2006.01)

(52) U.S. Cl.
CPC .............. *H04L 43/04* (2013.01); *G06F 1/324* (2013.01); *Y02B 60/1217* (2013.01)

(58) Field of Classification Search
CPC ....... G06F 1/324; G06F 1/3203; H04L 43/04; H04L 13/08; H04L 12/26
USPC .................................................. 709/223–235
See application file for complete search history.

(56) References Cited

U.S. PATENT DOCUMENTS

| 5,487,066 A * | 1/1996 | McNamara | H04L 12/2801 370/410 |
| 6,400,683 B1 | 6/2002 | Jay et al. | |
| 7,636,022 B2 * | 12/2009 | Shenoi | H04J 3/0632 331/1 A |
| 7,684,413 B2 * | 3/2010 | Skerritt | H04J 3/0658 370/299 |
| 7,894,489 B2 * | 2/2011 | Shenoi | G06F 5/14 370/429 |
| 8,005,078 B2 * | 8/2011 | Hisamatsu | G06F 1/3203 370/360 |

(Continued)

FOREIGN PATENT DOCUMENTS

| JP | 2003-273914 A | 9/2003 |
| JP | 2006-148227 A | 6/2006 |

(Continued)

OTHER PUBLICATIONS

Japanese Notice of Rejection issued in corresponding Japanese Patent Application No. 2014-069690, mailed on May 19, 2015; 7 pages with English translation.

(Continued)

*Primary Examiner* — Moustafa M Meky
*Assistant Examiner* — Thorne E Waugh
(74) *Attorney, Agent, or Firm* — McDermott Will & Emery LLP

(57) ABSTRACT

The present invention accumulates received information in a buffer, monitors a buffer accumulation amount, which is an amount of information accumulated in the buffer, adjusts a clock frequency used to output the information from the buffer based on the monitored buffer accumulation amount, and outputs the information from the buffer in accordance with the adjusted clock frequency.

19 Claims, 10 Drawing Sheets

(56) References Cited

U.S. PATENT DOCUMENTS

| | | | | |
|---|---|---|---|---|
| 8,279,787 B2* | 10/2012 | Hisamatsu | ............ | G06F 1/3203 |
| | | | | 365/227 |
| 8,477,789 B2* | 7/2013 | Hamamoto | ........... | H04J 3/0632 |
| | | | | 370/395.62 |
| 8,635,486 B2* | 1/2014 | Hildebrand | ........... | G06F 1/3203 |
| | | | | 710/57 |
| 8,842,534 B2* | 9/2014 | Hahn | .................... | H04J 3/0632 |
| | | | | 370/231 |
| 8,971,471 B2* | 3/2015 | Kim | ....................... | H04H 20/67 |
| | | | | 375/354 |
| 9,195,296 B2* | 11/2015 | Shahidi | ................. | G06F 1/3203 |
| 2013/0290768 A1* | 10/2013 | Kitamura | ................. | G06F 1/08 |
| | | | | 713/503 |

FOREIGN PATENT DOCUMENTS

| | | |
|---|---|---|
| JP | 2006-238044 A | 9/2006 |
| JP | 2007-158879 A | 6/2007 |
| JP | 2007-295491 A | 11/2007 |
| JP | 2008-066831 A | 3/2008 |
| JP | 2009-200787 A | 9/2009 |
| JP | 2010-232706 A | 10/2010 |

OTHER PUBLICATIONS

Notice of Rejection Japanese Patent Application No. 2014-069690 dated Oct. 22, 2015 with full English translation.

* cited by examiner

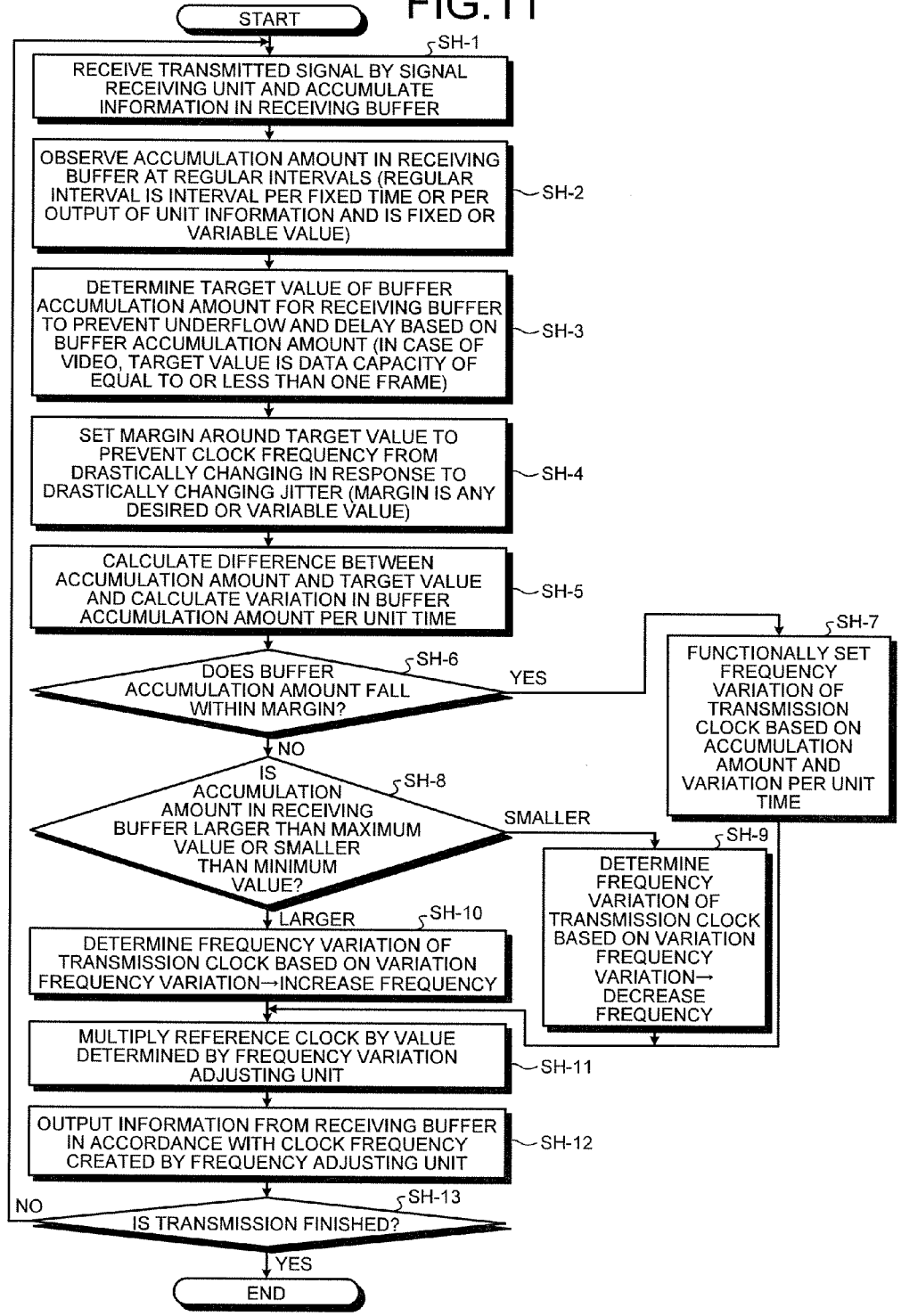

INFORMATION-PROCESSING APPARATUS AND OUTPUT ADJUSTMENT METHOD

CROSS-REFERENCE TO RELATED APPLICATION

This application is based upon and claims the benefit of priority from Japanese Patent Application No. 2014-069690, filed Mar. 28, 2014, the entire contents of which are incorporated herein by reference.

BACKGROUND OF THE INVENTION

1. Field of the Invention

The present invention relates to an information-processing apparatus and an output adjustment method.

2. Description of the Related Art

Conventionally, technologies to suppress overflow or underflow of received data are disclosed.

A technology is disclosed to perform clock adjustment on the entire network by transmitting a clock adjustment amount from a packet receiver to a packet transmitter via a communication channel (refer to JP-A-2006-148227).

A technology is disclosed to control output in a receiver by transmitting reference information from a video server on a transmission side to the receiver via a network (refer to JP-A-2007-158879).

In such conventional communication systems (e.g., JP-A-2006-148227), however, a reception side alone cannot perform clock adjustment on temporal fluctuation caused by a transmission path or a device.

SUMMARY OF THE INVENTION

It is an object of the present invention to at least partially solve the problems in the conventional technology.

An information-processing apparatus according to one aspect of the present invention includes an accumulating unit that accumulates received information in a buffer, a monitoring unit that monitors a buffer accumulation amount serving as an amount of information accumulated in the buffer, a frequency adjusting unit that adjusts a clock frequency used to output the information from the buffer based on the buffer accumulation amount monitored by the monitoring unit, and an information outputting unit that outputs the information from the buffer in accordance with the clock frequency adjusted by the frequency adjusting unit.

An output adjustment method according to another aspect of the present invention is executed by an image-reading apparatus including an accumulating step of accumulating received information in a buffer, a monitoring step of monitoring a buffer accumulation amount serving as an amount of information accumulated in the buffer, a frequency adjusting step of adjusting a clock frequency used to output the information from the buffer based on the buffer accumulation amount monitored at the monitoring step, and an information outputting step of outputting the information from the buffer in accordance with the clock frequency adjusted at the frequency adjusting step.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 11 is a flowchart of an example of the processing performed by the information-processing apparatus according to the present embodiment.

DETAILED DESCRIPTION OF THE PREFERRED EMBODIMENTS

Embodiments of an information-processing apparatus, an output adjustment method, and a computer program product according to the present invention are explained below in greater detail with reference to the accompanying drawings. The embodiments are not intended to limit the present invention.

1. Configuration of the Present Embodiment

Figure 1:
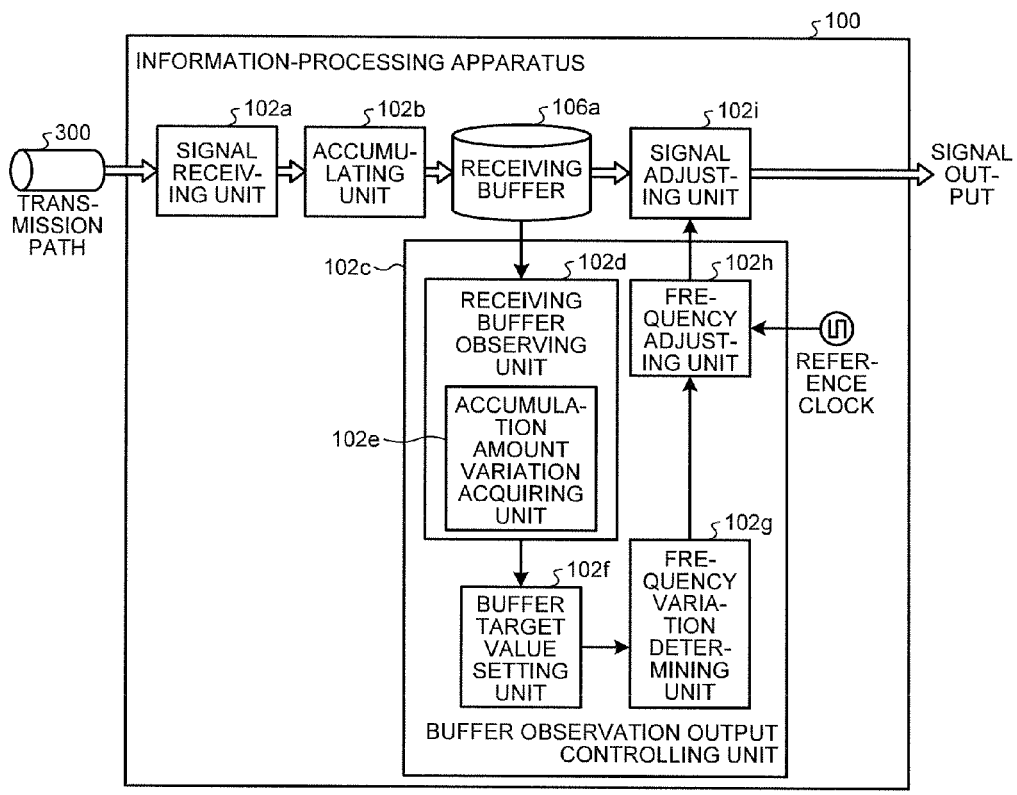
FIG. 1 is a hardware block diagram of an example of a configuration of an information-processing apparatus according to an embodiment of the present invention.
Figure 2:
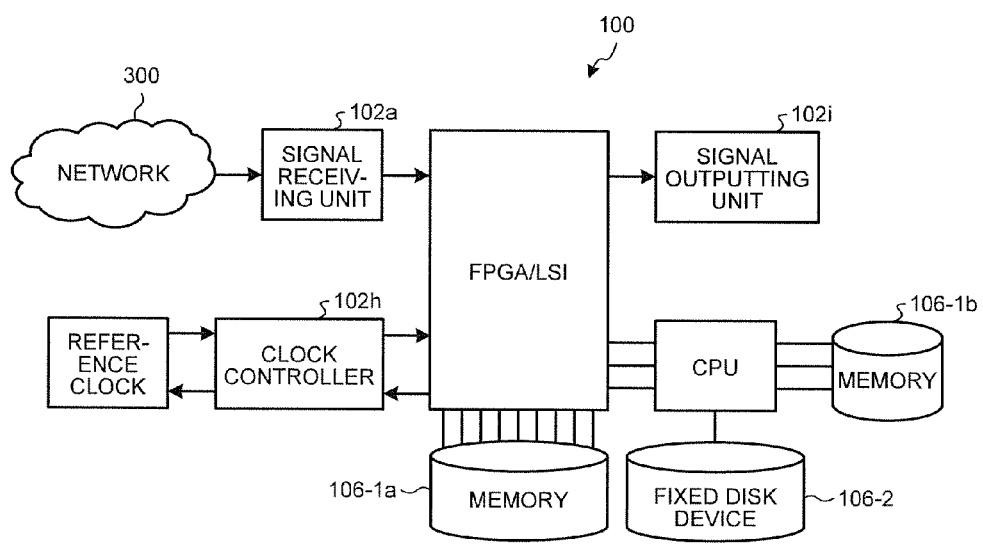
FIG. 2 is a hardware block diagram of an example of the configuration of the information-processing apparatus according to the present embodiment.

An example of a configuration of an information-processing apparatus 100 according to an embodiment of the present invention is explained with reference to FIG. 1 and FIG. 2. FIG. 1 is a hardware block diagram of an example of the configuration of the information-processing apparatus 100 according to the present embodiment. FIG. 2 is a hardware block diagram of an example of the configuration of the information-processing apparatus 100 according to the present embodiment.

As shown in FIG. 1, an information-processing apparatus (a receiver) 100 is communicably connected to a transmitter 200 (not shown) via a network (a transmission path) 300. The information-processing apparatus 100 may be communicably connected to an output device 400 (not shown) via the network (transmission path) 300. FIG. 1 may depict a part or the whole of the information-processing apparatus 100.

The network 300 has a function to interconnect the information-processing apparatus 100 and an external device (e.g., the transmitter 200 or the output device 400) in a wired or wireless manner. The network 300 may be the Internet, a telephone line network (e.g., a mobile terminal line network or a general telephone line network), an intranet, satellite waves, terrestrial waves, a dedicated line (e.g., a serial digital interface (SDI) or a line), or power line communication (PLC), for example.

Communications via the network 300 may be any one or both of reception of video via a dedicated line, such as the SDI, reception of audio via a dedicated line, such as the line, multicast distribution, streaming distribution, reception from a measuring device like a sensor, reception of video or audio through satellite broadcast, and reception of data, video, or audio by a field pickup unit (FPU), for example.

As shown in FIG. 1, the information-processing apparatus 100 includes a control unit 102 and a storage unit 106. The storage unit 106 stores therein any one or both of various types of databases, tables, and files, for example. The storage unit 106 is a storage unit and may be any one or both of a memory like a random access memory (RAM) and a read-only memory (ROM), a fixed disk device like a hard disk, a flexible disk, and an optical disk, for example. The storage unit 106 stores therein a computer program and the like to instruct a central processing unit (CPU) to perform various types of processing.

A buffer (a receiving buffer) 106a out of the components of the storage unit 106 retains (stores therein) received information. The buffer 106a, for example, may retain received internet protocol (IP) data.

The information-processing apparatus 100 may further include an input/output unit 112 (not shown) that performs input and output (I/O) of information (a signal), a command, or the like. The input/output unit 112 may be a key input unit, a touch panel, a control pad (e.g., a touch pad and a game pad), a mouse, a keyboard, and a microphone, for example. The input/output unit 112 may be a display unit that displays information (a signal) (e.g., a display, a monitor, and a touch panel formed of liquid crystals, organic electroluminescence (EL), or the like). The input/output unit 112 may be an audio output unit (e.g., a speaker) that outputs audio information as audio.

The information-processing apparatus 100 may further include an input and output interface (not shown) that connects the input/output unit 112 and the control unit 102. The information-processing apparatus 100 may further include a communication interface (not shown). The information-processing apparatus 100 may be communicably interconnected to an external device (e.g., the transmitter 200 or the output device 400) through the network (transmission path) 300 via the communication interface. The communication interface is an interface connected to a communication device like any one or both of an antenna, a router, and the like connected to any one or both of a communication line, a telephone line, and the like. The communication interface may have a function to perform communication control between the information-processing apparatus 100 and the network 300. The communication interface may be a network interface card (NIC) or the like. These units are communicably connected via any desired communication path.

The control unit 102 is formed of a CPU or the like that collectively controls the information-processing apparatus 100. The control unit 102 includes an internal memory that stores therein a control program, a computer program defining various types of processing procedures and the like, and major data. The control unit 102 performs information processing to perform various types of processing according to these computer programs.

The control unit 102 roughly includes a signal receiving unit 102a, an accumulating unit 102b, a buffer observation output controlling unit 102c, and an information outputting unit (a signal adjusting unit) 102i.

The signal receiving unit 102a receives a transmitted signal. The signal receiving unit 102a may receive a signal transmitted from the transmitter 200 via the network 300.

The accumulating unit 102b accumulates received information in the buffer 106a. The accumulating unit 102b may convert (restore) a signal received by the signal receiving unit 102a into information and accumulate the information in the buffer 106a. The accumulating unit 102b, for example, may convert a signal received by the signal receiving unit 102a into such as video and accumulate such as the video in the buffer 106a.

The buffer observation output controlling unit 102c observes information stored in the buffer 106a and performs output control. The buffer observation output controlling unit 102c functionally includes a monitoring unit (a receiving buffer observing unit) 102d, a target value setting unit (a buffer target value setting unit) 102f, a frequency variation determining unit 102g, and a frequency adjusting unit 102h.

The monitoring unit (receiving buffer observing unit) 102d monitors (observes) the buffer accumulation amount, which is the amount of information accumulated in the buffer 106a. The monitoring unit 102d functionally includes an accumulation amount variation acquiring unit 102e.

The accumulation amount variation acquiring unit 102e acquires a buffer accumulation amount variation per unit time based on the difference between the buffer accumulation amount and a target value of the buffer accumulation amount.

The target value setting unit (buffer target value setting unit) 102f sets a target value of the buffer accumulation amount. The target value setting unit 102f may set the target value of the buffer accumulation amount based on the buffer accumulation amount monitored by the monitoring unit 102d. The target value setting unit 102f may set a margin around the target value.

The target value setting unit 102f may set a plurality of margins in stages around the target value. The target value setting unit 102f may set the target value of the buffer accumulation amount based on the variation process of the buffer accumulation amount monitored by the monitoring unit 102d. The target value may be set to approximately 4 MB to 19 MB (in other words, the target value may increase and decrease depending on any one or both of a format and settings).

The frequency variation determining unit 102g determines a frequency variation to adjust a clock frequency. The frequency variation determining unit 102g may determine the frequency variation to adjust a clock frequency by comparing the buffer accumulation amount monitored by the monitoring unit 102d and a predetermined value. The frequency variation determining unit 102g may determine the frequency variation by comparing the buffer accumulation amount monitored by the monitoring unit 102d and the target value.

The frequency variation determining unit 102g may determine the frequency variation by determining whether the buffer accumulation amount monitored by the monitoring unit 102d falls within the margin set around the predetermined value. The frequency variation determining unit 102g may determine the frequency variation by determining whether the buffer accumulation amount monitored by the monitoring unit 102*d* falls within the margin set by the target value setting unit 102*f*.

The frequency variation determining unit 102*g* may determine the frequency variation to adjust a clock frequency based on the buffer accumulation amount variation. If it is determined that the buffer accumulation amount monitored by the monitoring unit 102*d* falls within any one of the margins set by the target value setting unit 102*f*, the frequency variation determining unit 102*g* may determine the frequency variation in stages based on the margin. The frequency variation determining unit 102*g* may determine the frequency variation based on the difference between the buffer accumulation amount monitored by the monitoring unit 102*d* and the target value.

The frequency adjusting unit 102*h* adjusts a clock frequency used to output information from the buffer 106*a*. The frequency adjusting unit 102*h* may adjust the clock frequency used to output information from the buffer 106*a* based on the buffer accumulation amount monitored by the monitoring unit 102*d*. The frequency adjusting unit 102*h* may use the frequency variation to adjust the clock frequency for outputting information from the buffer 106*a*.

The frequency adjusting unit 102*h* may adjust such that the clock frequency used to output information from the buffer 106*a* functionally changes based on the buffer accumulation amount monitored by the monitoring unit 102*d*. The frequency adjusting unit 102*h* may adjust the clock frequency used to output information from the buffer 106*a* based on a reference clock. A reference clock of 27 MHz may be increased to 148.5 MHz or 148.5/1.001 MHz by a phase locked loop (PLL), for example.

The information outputting unit (signal adjusting unit) 102*i* outputs information from the buffer 106*a*. The information outputting unit 102*i* may output the information from the buffer 106*a* in accordance with the clock frequency adjusted by the frequency adjusting unit 102*h*. The information outputting unit 102*i* may convert the information accumulated (stored) in the buffer 106*a* into a signal and transmit (output) the signal to the output device 400. The information outputting unit 102*i* may output the information accumulated (stored) in the buffer 106*a* via the input/output unit 112.

As shown FIG. 2, the information-processing apparatus 100 is communicably connected to the transmitter 200 (not shown) via the network 300. The information-processing apparatus 100 includes the signal receiving unit 102*a*, a field programmable gate array/large scale integration (FPGA/LSI) and a CPU, a memory 106-1*a*, a memory 106-1*b*, a fixed disk device 106-2, the frequency adjusting unit (clock controller) 102*h*, and the information outputting unit (signal outputting unit) 102*i*. The signal receiving unit 102*a* receives a signal transmitted from the transmitter 200. The FPGA/LSI and the CPU observe information stored in the information-processing apparatus 100 and perform output control and other processing. The memory 106-1*a* stores therein received information and the like and is connected to the FPGA/LSI. The memory 106-1*b* and the fixed disk device 106-2 are connected to the CPU. The frequency adjusting unit 102*h* adjusts a clock frequency used to output information based on a reference clock. The information outputting unit 102*i* outputs information. The fixed disk device 106-2 may store therein an operating system (OS) and the like. These units are communicably connected via any desired communication path.

In other words, in the present embodiment, the information-processing apparatus 100 may has any one or both of a function to input, output, or input and output information, a function to retain information, a function to control a clock frequency, a function to monitor the buffer accumulation amount, a function to determine a target value of the buffer, a function to control an output clock frequency with a reference clock, and a function to output information stored in the buffer in accordance with the clock frequency.

3. Processing According to the Present Embodiment

An example of processing performed by the information-processing apparatus 100 having the configuration will be explained with reference to FIG. 3 to FIG. 11.

3-1. First Example

Figure 3:
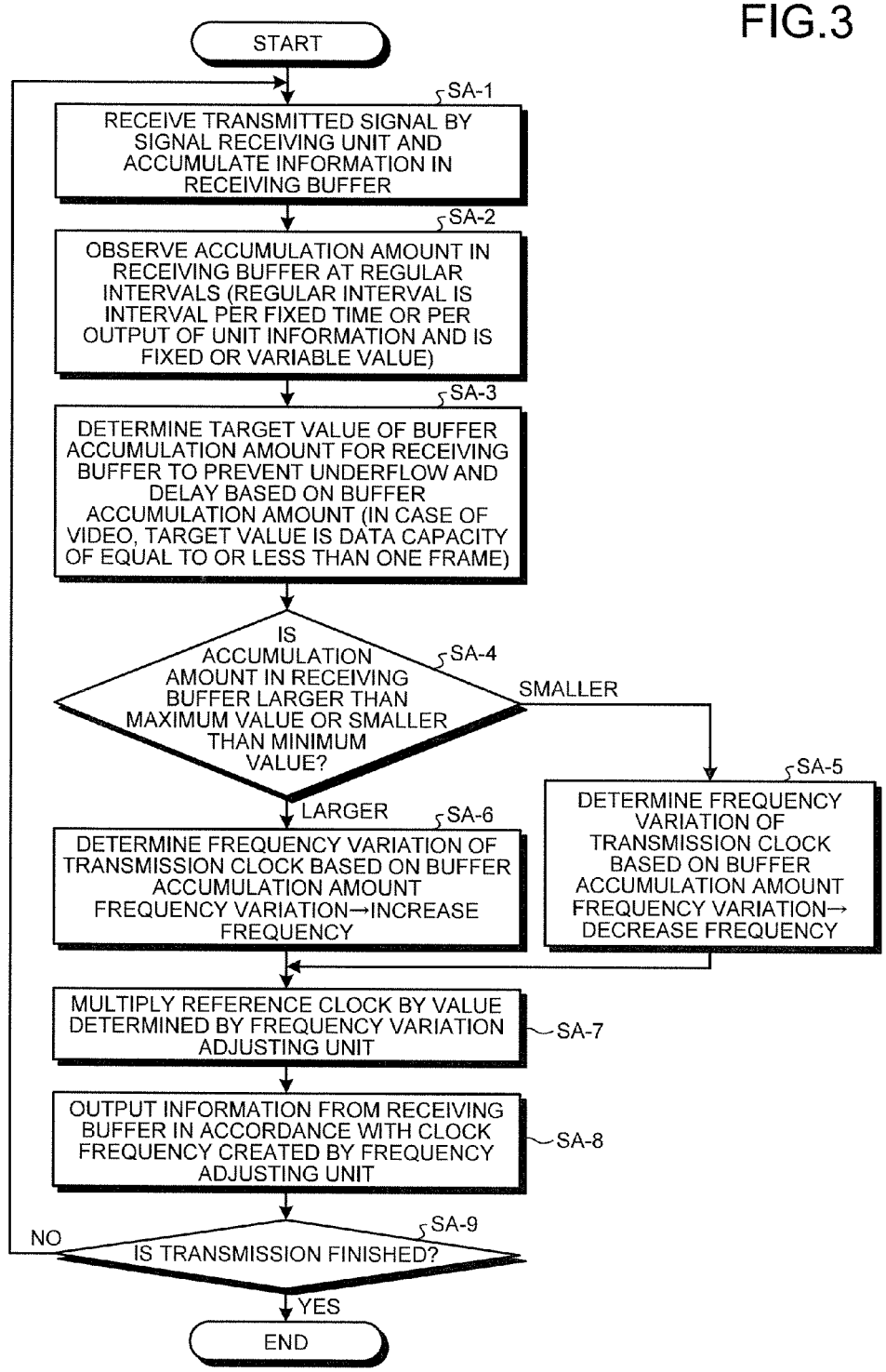
FIG. 3 is a flowchart of an example of processing performed by the information-processing apparatus according to the present embodiment.

An example of the processing performed by the information-processing apparatus 100 according to the present embodiment will be explained with reference to FIG. 3. FIG. 3 is a flowchart of an example of the processing performed by the information-processing apparatus 100 according to the present embodiment.

As shown in FIG. 3, the signal receiving unit 102*a* receives a signal transmitted from the transmitter 200, and the accumulating unit 102*b* converts the received signal into information and accumulates the information in the buffer (receiving buffer) 106*a* (Step SA-1). In other words, the signal receiving unit 102*a* receives the received signal, and the accumulating unit 102*b* temporarily accumulates the information in the receiving buffer 106*a*.

The monitoring unit 102*d* observes the buffer accumulation amount, which is the amount of information accumulated in the buffer (receiving buffer) 106*a* at regular intervals (Step SA-2). The regular intervals are intervals per fixed time or per output of unit information and may be a fixed or variable value.

In other words, the monitoring unit 102*d* monitors the accumulation amount of information accumulated in the receiving buffer 106*a* at intervals of a certain fixed time. The timing to monitor the accumulation amount in the buffer 106*a* and the width of the interval may be set to every one second, for example. Because the FPGA is configured to update the accumulation amount every one frame of a moving image, the timing to monitor the accumulation amount in the buffer 106*a* and the width of the interval depend on a format. The interval can be reduced to approximately 0.0167 seconds (or 0.03 seconds, for example) in the case of 60p. In other words, the width of the interval to monitor the accumulation amount may be set to 1/60≅0.0167 seconds in the case of 60 frames per second.

The target value setting unit 102*f* sets (determines) the target value (the maximum value and the minimum value) of the buffer accumulation amount for the buffer (receiving buffer) 106*a* based on the buffer accumulation amount monitored by the monitoring unit 102*d* to prevent any one or both of underflow and delay (Step SA-3). In the case of video, the target value may be data capacity of equal to or less than one frame. In other words, the target value setting unit 102*f* sets the target value of the buffer accumulation amount based on the monitored buffer accumulation amount.

The monitoring unit 102*d* determines whether the observed buffer accumulation amount in the buffer (receiving buffer) 106*a* is larger than the maximum value or smaller than the minimum value (Step SA-4). In other words, the monitoring unit 102d compares the target value and the buffer accumulation amount.

If the monitoring unit 102d determines that the buffer accumulation amount in the buffer 106a is smaller than the minimum value (smaller at Step SA-4), the frequency variation determining unit 102g determines the frequency variation of a transmission clock (to adjust the clock frequency used to output information from the buffer 106a) so as to decrease the clock frequency based on the buffer accumulation amount (Step SA-5), the process is shifted to Step SA-7. In other words, because "the buffer accumulation amount<the target value" is satisfied, that is, the buffer accumulation amount is small, the frequency variation determining unit 102g decreases the frequency to slow down the output from the buffer.

By contrast, if the monitoring unit 102d determines that the buffer accumulation amount in the buffer 106a is larger than the maximum value (larger at Step SA-4), the frequency variation determining unit 102g determines the frequency variation of the transmission clock (to adjust the clock frequency used to output information from the buffer 106a) so as to increase the clock frequency based on the buffer accumulation amount (Step SA-6), the process is shifted to Step SA-7. In other words, because "the buffer accumulation amount>the target value" is satisfied, that is, the buffer accumulation amount is large, the frequency variation determining unit 102g increases the frequency to accelerate the output from the buffer.

The frequency adjusting unit 102h adjusts (creates) the clock frequency used to output information from the buffer 106a by multiplying the reference clock by the value of the frequency variation determined by the frequency variation determining unit 102g (Step SA-7). In other words, in the present embodiment, the frequency adjusting unit 102h may receive the reference clock and multiply the reference clock by a value determined by the frequency variation determining unit 102g.

The information outputting unit 102i outputs information from the buffer (receiving buffer) 106a in accordance with the clock frequency adjusted (created) by the frequency adjusting unit 102h (Step SA-8). The information outputting unit 102i may convert the information accumulated in the buffer 106a into a signal and transmit and output the signal to the output device 400. The information outputting unit 102i may output the information accumulated in the buffer 106a via the input/output unit 112. In other words, the information outputting unit 102i outputs the information from the receiving buffer 106a in accordance with the set clock frequency.

The signal receiving unit 102a determines whether transmission of the signal from the transmitter 200 is finished (Step SA-9).

If the signal receiving unit 102a determines that transmission of the signal from the transmitter 200 is not finished yet (No at Step SA-9), the process is shifted to Step SA-1.

By contrast, if the signal receiving unit 102a determines that transmission of the signal from the transmitter 200 is finished (Yes at Step SA-9), the process is ended. As described above, the present embodiment monitors the buffer accumulation amount to adjust the clock frequency. Thus, the present embodiment can minimize the accumulation amount in the buffer, thereby minimizing delay in the output. In other words, the present embodiment may minimize delay in the output by controlling the output clock frequency so as to minimize the buffer accumulation amount.

3-2. Second Example

Figure 4:
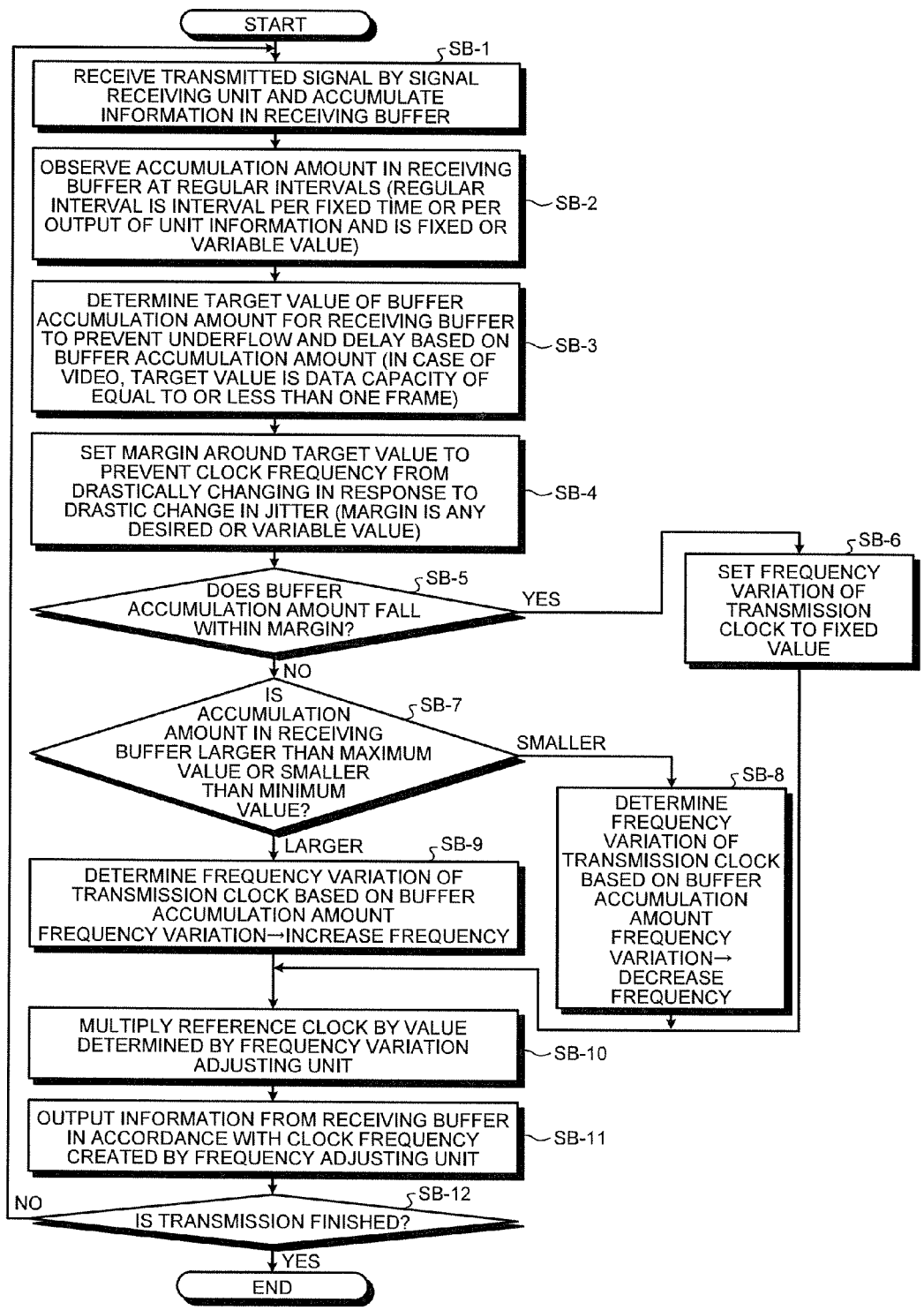
FIG. 4 is a flowchart of an example of the processing performed by the information-processing apparatus according to the present embodiment.

An example of the processing performed by the information-processing apparatus 100 according to the present embodiment will be explained with reference to FIG. 4 and FIG. 5. FIG. 4 is a flowchart of an example of the processing performed by the information-processing apparatus 100 according to the present embodiment.

As shown in FIG. 4, the signal receiving unit 102a receives a signal transmitted from the transmitter 200, and the accumulating unit 102b converts the received signal into information and accumulates the information in the buffer (receiving buffer) 106a (Step SB-1). In other words, the signal receiving unit 102a receives the received signal, and the accumulating unit 102b temporarily accumulates the information in the receiving buffer 106a.

The monitoring unit 102d observes the buffer accumulation amount, which is the amount of information accumulated in the buffer (receiving buffer) 106a at regular intervals (Step SB-2). The regular intervals are intervals per fixed time or per output of unit information and may be a fixed or variable value. In other words, the monitoring unit 102d monitors the temporarily accumulated information at intervals of a certain fixed time.

The target value setting unit 102f sets (determines) the target value (the maximum value and the minimum value) of the buffer accumulation amount for the buffer (receiving buffer) 106a based on the buffer accumulation amount monitored by the monitoring unit 102d to prevent any one or both of underflow and delay (Step SB-3). In other words, the target value setting unit 102f sets the target value of the buffer accumulation amount based on the monitored buffer accumulation amount.

Because jitter drastically changes, the target value setting unit 102f sets a margin around the target value to prevent the clock frequency from drastically changing in response to the jitter (Step SB-4). The margin may be any desired or variable value. The upper limit of the margin may be set to the target value+0.015 MB, whereas the lower limit of the margin may be set to the target value−0.015 MB, for example. In other words, the target value setting unit 102f sets the margin to prevent the clock frequency from drastically changing in response to variation in the accumulation amount in the buffer 106a.

The monitoring unit 102d determines whether the observed buffer accumulation amount in the buffer (receiving buffer) 106a falls within the margin (Step SB-5). In other words, the monitoring unit 102d compares the margin set around the target value and the buffer accumulation amount.

If the monitoring unit 102d determines that the buffer accumulation amount in the buffer 106a falls within the margin (Yes at Step SB-5), the frequency variation determining unit 102g sets (determines) the frequency variation of the transmission clock (to adjust the clock frequency used to output information from the buffer 106a) to a fixed value (Step SB-6), the process is shifted to Step SB-10. In other words, if the buffer accumulation amount falls within the margin of the target value, the frequency variation determining unit 102g sets the clock frequency to a certain fixed value. In the present embodiment, the frequency variation determining unit 102g may set the frequency variation such that the clock frequency is the same as a previous frequency (used in the previous processing). In the initial state, the frequency variation may be set such that the clock frequency is the same as a reference frequency of the information-processing apparatus 100.

By contrast, if the monitoring unit 102d determines that the buffer accumulation amount in the buffer 106a does not fall within the margin (No at Step SB-5), the monitoring unit 102d determines whether the observed buffer accumulation amount in the buffer (receiving buffer) 106a is larger than the maximum value or smaller than the minimum value (Step SB-7). In other words, the monitoring unit 102d compares the target value and the buffer accumulation amount.

If the monitoring unit 102d determines that the buffer accumulation amount in the buffer 106a is smaller than the minimum value (smaller at Step SB-7), the frequency variation determining unit 102g determines the frequency variation of the transmission clock (to adjust the clock frequency used to output information from the buffer 106a) so as to decrease the clock frequency based on the buffer accumulation amount (Step SB-8), the process is shifted to Step SB-10. In other words, because the buffer accumulation amount does not fall within the margin of the target value and "the buffer accumulation amount<the target value–the margin" is satisfied, that is, the buffer accumulation amount is small, the frequency variation determining unit 102g decreases the frequency to slow down the output from the buffer.

By contrast, if the monitoring unit 102d determines that the buffer accumulation amount in the buffer 106a is larger than the maximum value (larger at Step SB-7), the frequency variation determining unit 102g determines the frequency variation of the transmission clock (to adjust the clock frequency used to output information from the buffer 106a) so as to increase the clock frequency based on the buffer accumulation amount (Step SB-9), the process is shifted to Step SB-10. In other words, because the buffer accumulation amount does not fall within the margin of the target value and "the buffer accumulation amount>the target value+the margin" is satisfied, that is, the buffer accumulation amount is large, the frequency variation determining unit 102g increases the frequency to accelerate the output from the buffer.

The frequency adjusting unit 102h adjusts (creates) the clock frequency used to output information from the buffer 106a by multiplying the reference clock by the value of the frequency variation determined by the frequency variation determining unit 102g (Step SB-10). In other words, the frequency adjusting unit 102h calculates the clock frequency used to output information from the buffer 106a.

The information outputting unit 102i outputs information from the buffer (receiving buffer) 106a in accordance with the clock frequency adjusted (created) by the frequency adjusting unit 102h (Step SB-11). The information outputting unit 102i may convert the information accumulated in the buffer 106a into a signal and transmit and output the signal to the output device 400. The information outputting unit 102i may output the information accumulated in the buffer 106a via the input/output unit 112. In other words, the information outputting unit 102i outputs the information from the receiving buffer 106a in accordance with the set clock frequency.

The signal receiving unit 102a determines whether transmission of the signal from the transmitter 200 is finished (Step SB-12).

If the signal receiving unit 102a determines that transmission of the signal from the transmitter 200 is not finished yet (No at Step SB-12), the process is shifted to Step SB-1.

By contrast, if the signal receiving unit 102a determines that transmission of the signal from the transmitter 200 is finished (Yes at Step SB-12), the process is ended. As described above, the present embodiment may monitor the buffer accumulation amount to (gradually) adjust the clock frequency. The present embodiment can minimize the buffer accumulation amount, thereby minimizing delay in the output.

An example of the relation between the buffer accumulation amount and elapsed time according to the present embodiment will be explained with reference to FIG. 5. FIG. 5 is a graph of an example of the relation between the buffer accumulation amount and elapsed time according to the present embodiment.

Figure 5:
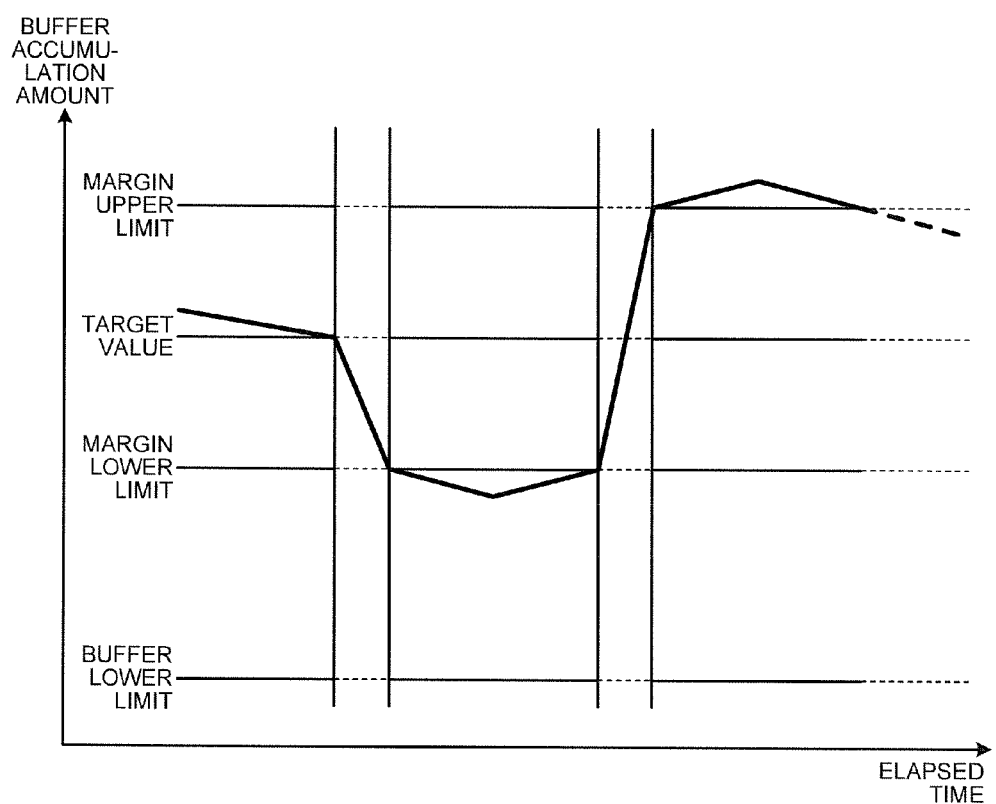
FIG. 5 is a graph of an example of the relation between a buffer accumulation amount and elapsed time according to the present embodiment.

As shown in FIG. 5, the present embodiment sets a margin (the margin upper limit and the margin lower limit) around the target value, thereby preventing the clock frequency from drastically changing in response to jitter even if the jitter drastically changes. Specifically, when the buffer accumulation amount exceeds the margin upper limit as shown in FIG. 5, the present embodiment sets the clock frequency higher, thereby increasing the output rate of the buffer 106a.

When the buffer accumulation amount falls below the margin lower limit as shown in FIG. 5, the present embodiment sets the clock frequency lower, thereby decreasing the output rate of the buffer 106a. Thus, the present embodiment can prevent the clock frequency from drastically changing around the target value in response to a drastic change in the jitter and stabilize the behavior of the clock frequency.

3-3. Third Example

Figure 6:
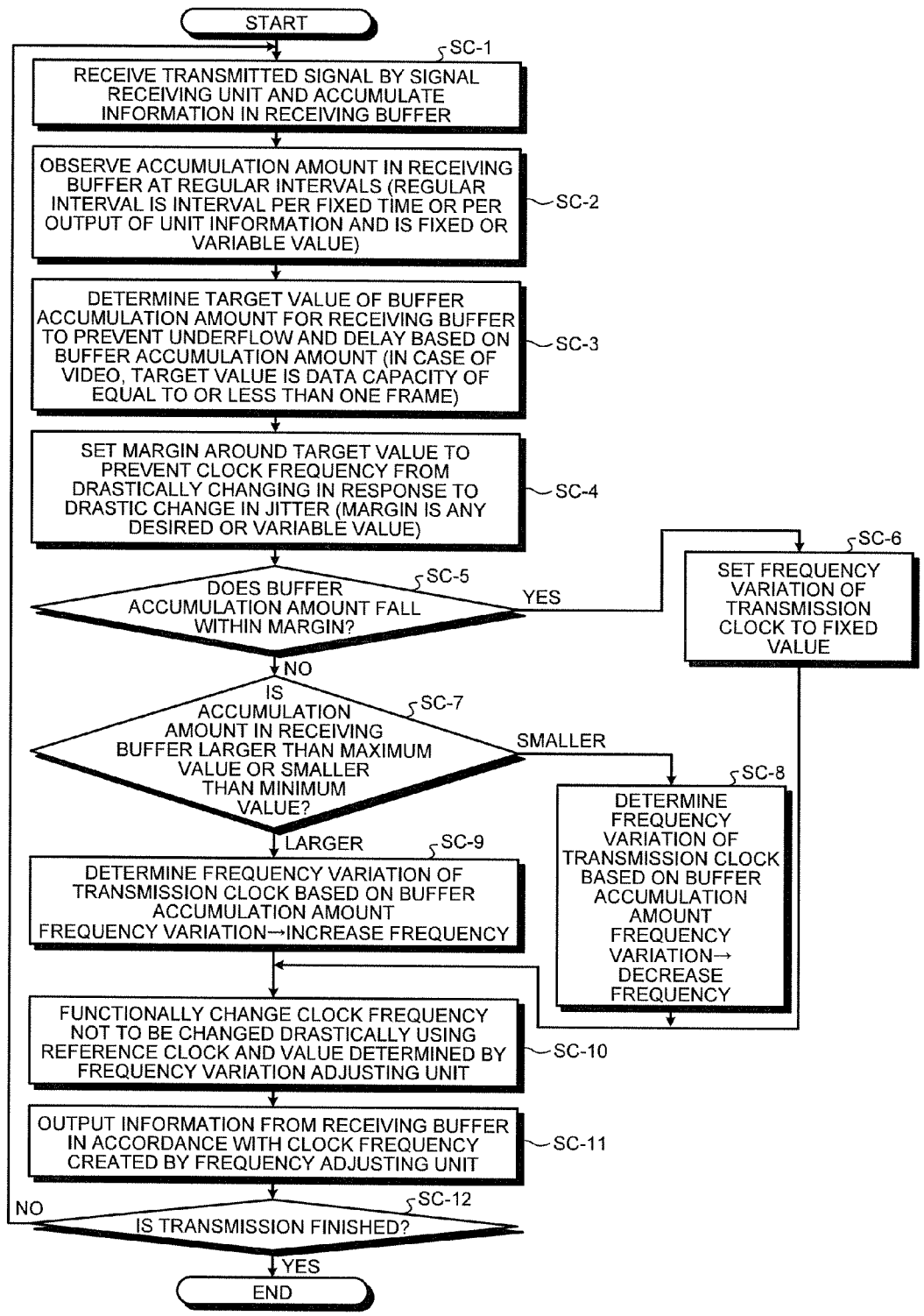
FIG. 6 is a flowchart of an example of the processing performed by the information-processing apparatus according to the present embodiment.

An example of the processing performed by the information-processing apparatus 100 according to the present embodiment will be explained with reference to FIG. 6. FIG. 6 is a flowchart of an example of the processing performed by the information-processing apparatus 100 according to the present embodiment.

Because processing at Step SC-1 to Step SC-9 shown in FIG. 6 is the same as the processing at Step SB-1 to Step SB-9 shown in FIG. 4, an explanation thereof will be omitted.

The frequency adjusting unit 102h adjusts (creates) the clock frequency used to output information from the buffer 106a such that the clock frequency is changed functionally not to be changed drastically using the reference clock and the value of the frequency variation determined by the frequency variation determining unit 102g (Step SC-10). In other words, the frequency adjusting unit 102h calculates the clock frequency used to output information from the buffer 106a.

Because processing at Step SC-11 and Step SC-12 is the same as the processing at Step SB-11 and Step SB-12 shown in FIG. 4, an explanation thereof will be omitted.

As described above, the present embodiment functionally changes the clock frequency. Thus, the present embodiment can minimize the accumulation amount in the buffer 106a, thereby minimizing delay in the output. The present embodiment enables the clock frequency to fall within around the margin.

3-4. Fourth Example

Figure 7:
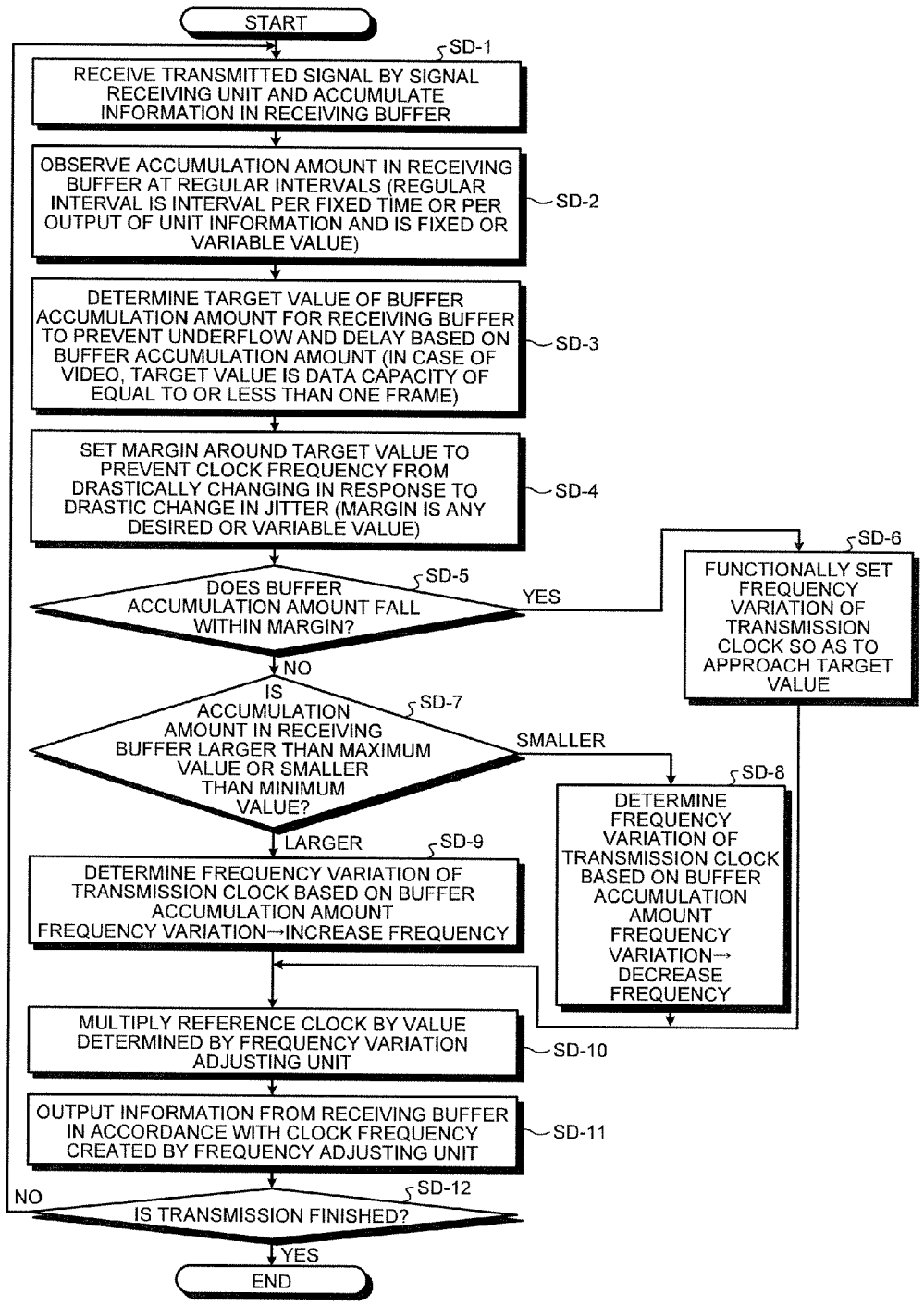
FIG. 7 is a flowchart of an example of the processing performed by the information-processing apparatus according to the present embodiment.

An example of the processing performed by the information-processing apparatus 100 according to the present embodiment will be explained with reference to FIG. 7. FIG. 7 is a flowchart of an example of the processing performed by the information-processing apparatus 100 according to the present embodiment.

As shown in FIG. 7, because processing at Step SD-1 to Step SD-5 is the same as the processing at Step SB-1 to Step SB-5 shown in FIG. 4, an explanation thereof will be omitted.

If the monitoring unit 102d determines that the buffer accumulation amount in the buffer 106a falls within the margin (Yes at Step SD-5), the frequency variation determining unit 102g functionally sets (determines) the frequency variation of the transmission clock (to adjust the clock frequency used to output information from the buffer 106a) so as to approach the target value (Step SD-6), the process is shifted to Step SD-10. In other words, if the buffer accumulation amount falls within the margin of the target value, the frequency variation determining unit 102g sets the clock frequency so as to approach the target value.

Because processing at Step SD-7 to Step SD-12 is the same as the processing at Step SB-7 to Step SB-12 shown in FIG. 4, an explanation thereof will be omitted.

As described above, the present embodiment adjusts the clock frequency within the margin so as not to exceed the margin of the target value.

3-5. Fifth Example

Figure 8:
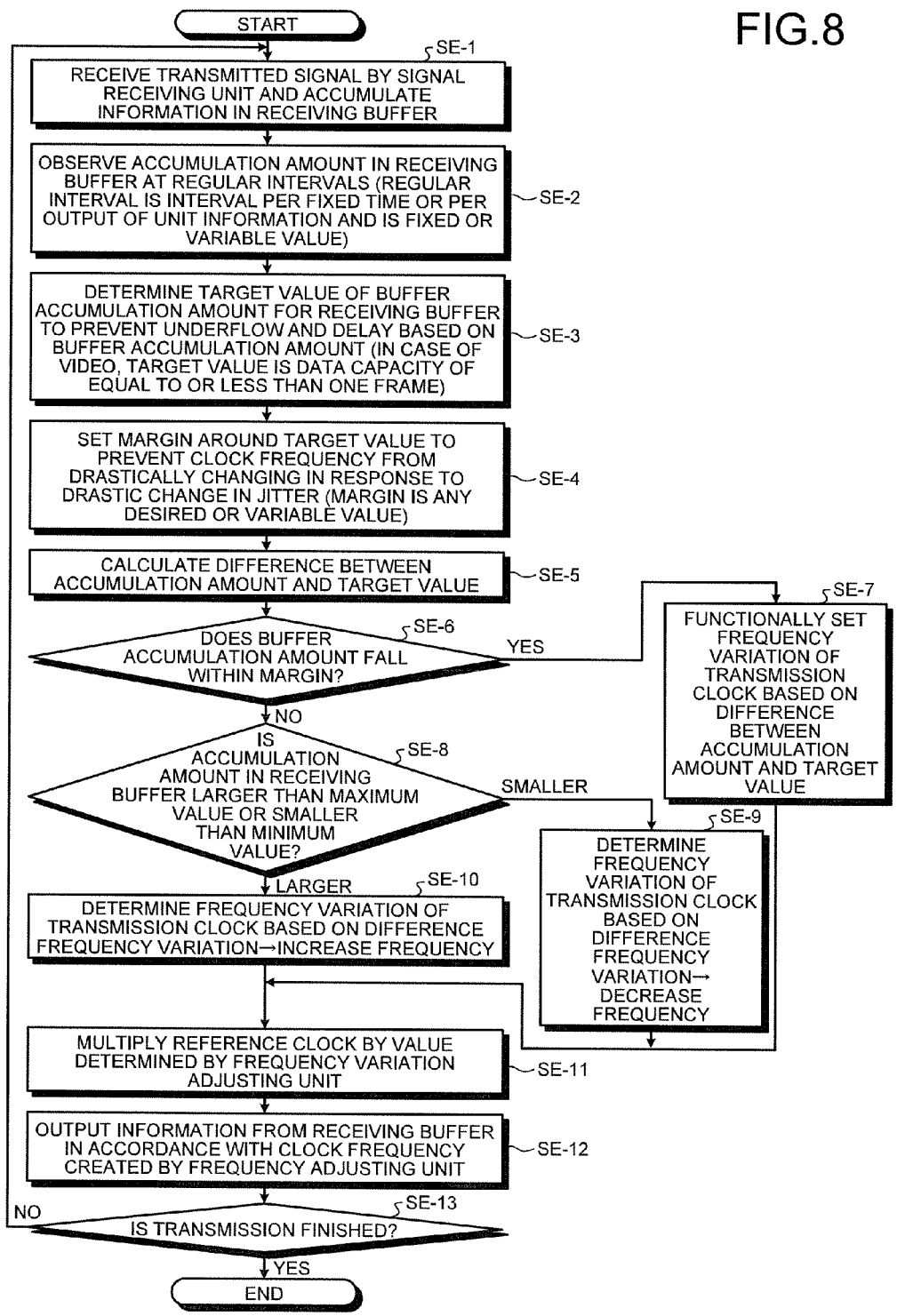
FIG. 8 is a flowchart of an example of the processing performed by the information-processing apparatus according to the present embodiment.

An example of the processing performed by the information-processing apparatus 100 according to the present embodiment will be explained with reference to FIG. 8. FIG. 8 is a flowchart of an example of the processing performed by the information-processing apparatus 100 according to the present embodiment.

As shown in FIG. 8, because processing at Step SE-1 to Step SE-4 is the same as the processing at Step SB-1 to Step SB-4 shown in FIG. 4, an explanation thereof will be omitted.

The monitoring unit 102d calculates the difference between the observed buffer accumulation amount in the buffer (receiving buffer) 106a and the target value (Step SE-5). In other words, the monitoring unit 102d calculates the difference between the accumulation amount and the target value.

The monitoring unit 102d determines whether the observed buffer accumulation amount in the buffer (receiving buffer) 106a falls within the margin (Step SE-6). In other words, the monitoring unit 102d compares the margin set around the target value and the buffer accumulation amount.

If the monitoring unit 102d determines that the buffer accumulation amount in the buffer 106a falls within the margin (Yes at Step SE-6), the frequency variation determining unit 102g functionally sets (determines) the frequency variation of the transmission clock (to adjust the clock frequency used to output information from the buffer 106a) based on the difference between the buffer accumulation amount and the target value (Step SE-7), the process is shifted to Step SE-11. In other words, if the buffer accumulation amount falls within the margin of the target value, the frequency variation determining unit 102g functionally sets the clock frequency based on the difference between the accumulation amount and the target value.

By contrast, if the monitoring unit 102d determines that the buffer accumulation amount in the buffer 106a does not fall within the margin (No at Step SE-6), the monitoring unit 102d determines whether the observed buffer accumulation amount in the buffer (receiving buffer) 106a is larger than the maximum value or smaller than the minimum value (Step SE-8). In other words, the monitoring unit 102d compares the target value and the buffer accumulation amount.

If the monitoring unit 102d determines that the buffer accumulation amount in the buffer 106a is smaller than the minimum value (smaller at Step SE-8), the frequency variation determining unit 102g determines the frequency variation of the transmission clock (to adjust the clock frequency used to output information from the buffer 106a) so as to decrease the clock frequency based on the difference between the accumulation amount and the target value (Step SE-9), the process is shifted to Step SE-11. In other words, because the buffer accumulation amount does not fall within the margin of the target value and "the buffer accumulation amount<the target value−the margin" is satisfied, that is, the buffer accumulation amount is small, the frequency variation determining unit 102g decreases the frequency based on the difference between the accumulation amount and the target value to slow down the output from the buffer.

By contrast, if the monitoring unit 102d determines that the buffer accumulation amount in the buffer 106a is larger than the maximum value (larger at Step SE-8), the frequency variation determining unit 102g determines the frequency variation of the transmission clock (to adjust the clock frequency used to output information from the buffer 106a) so as to increase the clock frequency based on the difference between the accumulation amount and the target value (Step SE-10), the process is shifted to Step SE-11. In other words, because the buffer accumulation amount does not fall within the margin of the target value and "the buffer accumulation amount>the target value+the margin" is satisfied, that is, the buffer accumulation amount is large, the frequency variation determining unit 102g increases the frequency based on the difference between the accumulation amount and the target value to accelerate the output from the buffer.

Because processing at Step SE-11 to Step SE-13 is the same as the processing at Step SB-10 to Step SB-12 shown in FIG. 4, an explanation thereof will be omitted.

As described above, the present embodiment adjusts the clock frequency based on the difference between the accumulation amount and the target value.

3-6. Sixth Example

Figure 9:
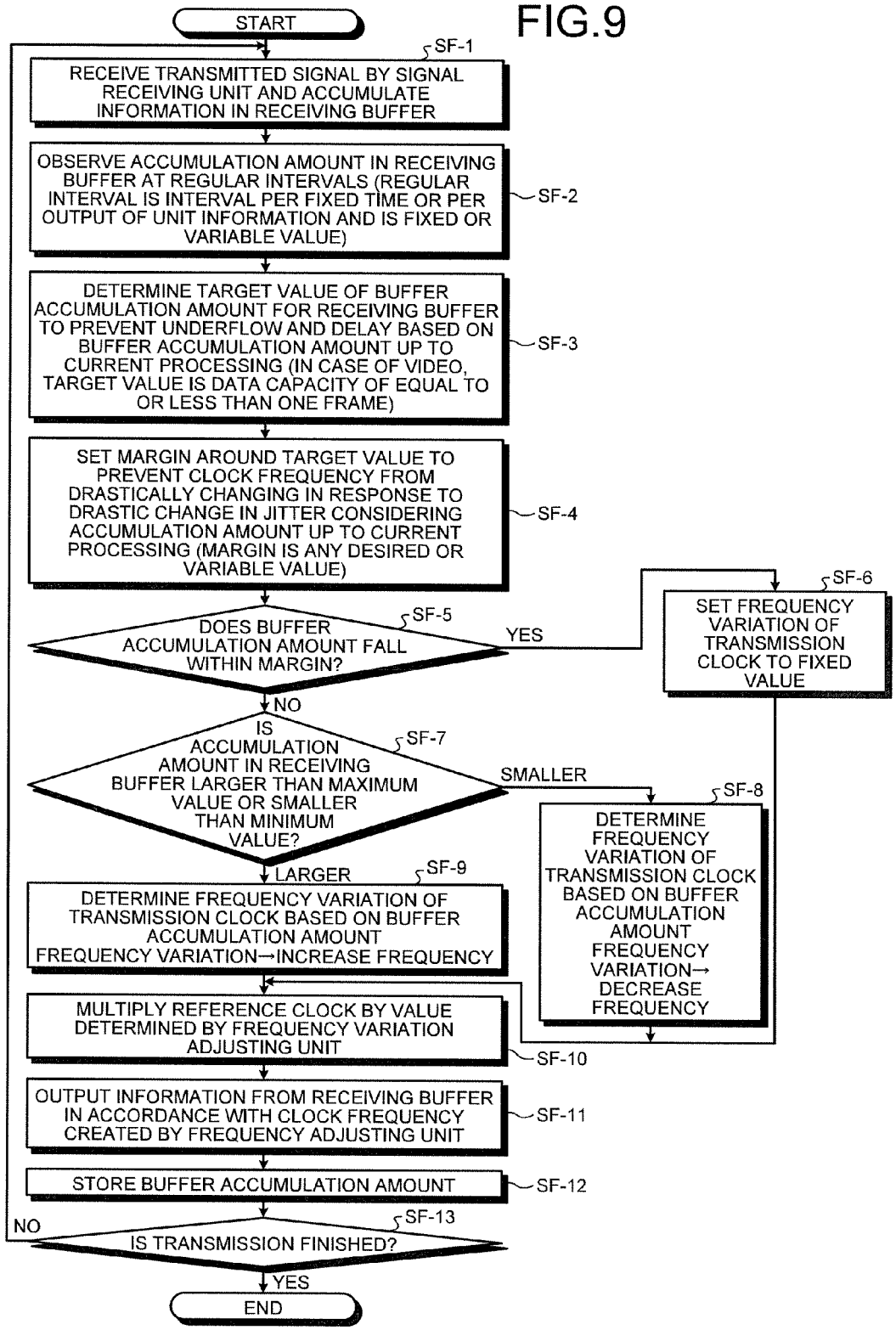
FIG. 9 is a flowchart of an example of the processing performed by the information-processing apparatus according to the present embodiment.

An example of the processing performed by the information-processing apparatus 100 according to the present embodiment will be explained with reference to FIG. 9. FIG. 9 is a flowchart of an example of the processing performed by the information-processing apparatus 100 according to the present embodiment.

As shown in FIG. 9, because processing at Step SF-1 and Step SF-2 is the same as the processing at Step SB-1 and Step SB-2 shown in FIG. 4, an explanation thereof will be omitted.

The target value setting unit 102f sets (determines) the target value (the maximum value and the minimum value) of the buffer accumulation amount for the buffer (receiving buffer) 106a to prevent any one or both of underflow and delay based on the buffer accumulation amount monitored up to the current processing by the monitoring unit 102d (variation process of the buffer accumulation amount) (Step SF-3). In other words, the target value setting unit 102f sets the target value of the receiving buffer accumulation amount based on the buffer accumulation amount monitored up to this time and stored in the storage unit 106.

Because jitter drastically changes, the target value setting unit 102f sets the margin around the target value to prevent the clock frequency from drastically changing in response to the jitter considering the buffer accumulation amount up to the current processing (variation process of the buffer accumulation amount) (Step SF-4). The margin may be any desired or variable value. In other words, the target value setting unit 102f sets the margin to prevent the clock frequency from drastically changing in response to variation in the accumulation amount in the buffer 106a based on the buffer accumulation amount monitored up to this time and stored in the storage unit 106.

Because processing at Step SF-5 to Step SF-11 is the same as the processing at Step SB-5 to Step SB-11 shown in FIG. 4, an explanation thereof will be omitted.

The monitoring unit 102d stores the observed buffer accumulation amount in the storage unit 106 (Step SF-12).

The signal receiving unit 102a determines whether transmission of the signal from the transmitter 200 is finished (Step SF-13).

If the signal receiving unit 102a determines that transmission of the signal from the transmitter 200 is not finished yet (No at Step SF-13), the process is shifted to Step SF-1.

By contrast, if the signal receiving unit 102a determines that transmission of the signal from the transmitter 200 is finished (Yes at Step SF-13), the process is ended. As described above, the present embodiment determines the target value and the margin based on the buffer accumulation amount monitored until the previous processing. Thus, the present embodiment can minimize the accumulation amount in the buffer 106a, thereby minimizing delay in the output. The present embodiment enables the clock frequency to fall within around the margin.

3-7. Seventh Example

Figure 10:
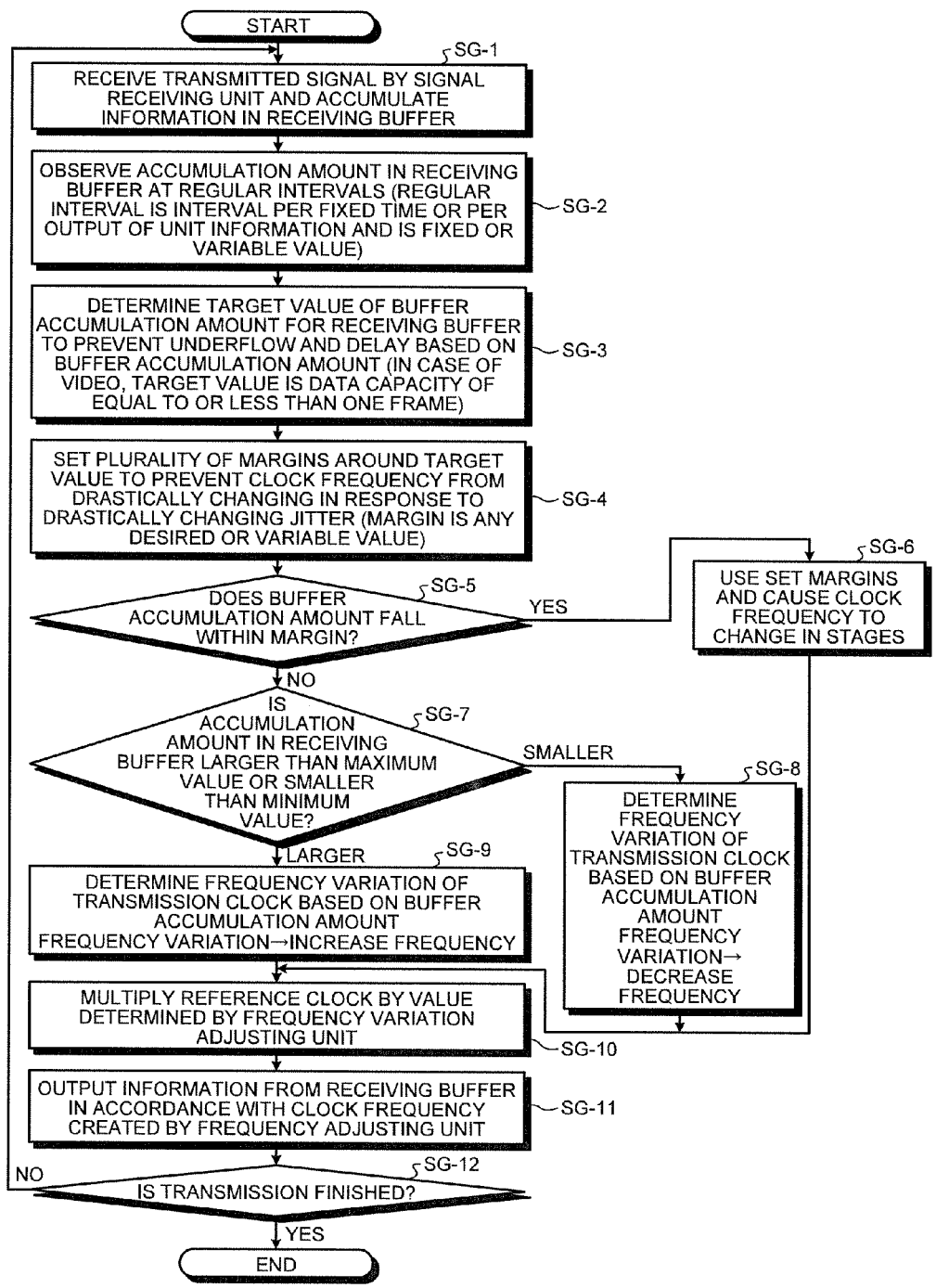
FIG. 10 is a flowchart of an example of the processing performed by the information-processing apparatus according to the present embodiment.

An example of the processing performed by the information-processing apparatus 100 according to the present embodiment will be explained with reference to FIG. 10. FIG. 10 is a flowchart of an example of the processing performed by the information-processing apparatus 100 according to the present embodiment.

As shown in FIG. 10, because processing at Step SG-1 to Step SG-3 is the same as the processing at Step SB-1 to Step SB-3 shown in FIG. 4, an explanation thereof will be omitted.

Because jitter drastically changes, the target value setting unit 102f sets a plurality of margins in stages around the target value to prevent the clock frequency from drastically changing in response to the jitter (Step SG-4). The margins may be desired or variable values. In other words, the target value setting unit 102f sets the margins to prevent the clock frequency from drastically changing in response to variation in the accumulation amount in the buffer 106a.

The monitoring unit 102d determines whether the observed buffer accumulation amount in the buffer (receiving buffer) 106a falls within the margins (Step SG-5). In other words, the monitoring unit 102d compares the margins set around the target value and the buffer accumulation amount.

If the monitoring unit 102d determines that the buffer accumulation amount in the buffer 106a falls within the margins (Yes at Step SG-5), the frequency variation determining unit 102g uses the margins set by the target value setting unit 102f, thereby setting (determining) the frequency variation of the transmission clock (to adjust the clock frequency used to output information from the buffer 106a) such that the clock frequency changes in stages (Step SG-6), the process is shifted to Step SG-10. In other words, if the buffer accumulation amount falls within the margins of the target value, the frequency variation determining unit 102g sets the clock frequency in stages so as to approach the target value.

Because processing at Step SG-7 to Step SG-12 is the same as the processing at Step SB-7 to Step SB-12 shown in FIG. 4, an explanation thereof will be omitted.

As described above, the present embodiment sets a plurality of margins to change the clock frequency in stages.

3-8. Eighth Example

An example of the processing performed by the information-processing apparatus 100 according to the present embodiment will be explained with reference to FIG. 11. FIG. 11 is a flowchart of an example of the processing performed by the information-processing apparatus 100 according to the present embodiment.

As shown in FIG. 11, because processing at Step SH-1 to Step SH-4 is the same as the processing at Step SB-1 to Step SB-4 shown in FIG. 4, an explanation thereof will be omitted.

The monitoring unit 102d calculates the difference between the observed buffer accumulation amount in the buffer (receiving buffer) 106a and the target value and calculates a variation in the buffer accumulation amount per unit time (Step SH-5). In other words, the monitoring unit 102d calculates the variation per unit time based on the difference between the accumulation amount and the target value.

The monitoring unit 102d determines whether the observed buffer accumulation amount in the buffer (receiving buffer) 106a falls within the margin (Step SH-6). In other words, the monitoring unit 102d compares the margin set around the target value and the buffer accumulation amount.

If the monitoring unit 102d determines that the buffer accumulation amount in the buffer 106a falls within the margin (Yes at Step SH-6), the frequency variation determining unit 102g functionally sets (determines) the frequency variation of the transmission clock (to adjust the clock frequency used to output information from the buffer 106a) based on the buffer accumulation amount and the variation in the buffer accumulation amount per unit time (Step SH-7), the process is shifted to Step SH-11. In other words, if the buffer accumulation amount falls within the margin of the target value, the frequency variation determining unit 102g functionally sets the clock frequency based on the accumulation amount and the variation per unit time.

By contrast, if the monitoring unit 102d determines that the buffer accumulation amount in the buffer 106a does not fall within the margin (No at Step SH-6), the monitoring unit 102d determines whether the observed buffer accumulation amount in the buffer (receiving buffer) 106a is larger than the maximum value or smaller than the minimum value (Step SH-8). In other words, the monitoring unit 102d compares the target value and the buffer accumulation amount.

If the monitoring unit 102d determines that the buffer accumulation amount in the buffer 106a is smaller than the minimum value (smaller at Step SH-8), the frequency variation determining unit 102g determines the frequency variation of the transmission clock (to adjust the clock frequency used to output information from the buffer 106a) so as to decrease the clock frequency based on the variation in the buffer accumulation amount per unit time (Step SH-9), the process is shifted to Step SH-11. In other words, because the buffer accumulation amount does not fall within the margin of the target value and "the buffer accumulation amount<the target value−the margin" is satisfied, that is, the buffer accumulation amount is small, the frequency variation determining unit 102g decreases the frequency based on the accumulation amount and the variation per unit time to slow down the output from the buffer.

By contrast, if the monitoring unit 102d determines that the buffer accumulation amount in the buffer 106a is larger than the maximum value (larger at Step SH-8), the frequency variation determining unit 102g determines the frequency variation of the transmission clock (to adjust the clock frequency used to output information from the buffer 106a) so as to increase the clock frequency based on the variation in the buffer accumulation amount per unit time (Step SH-10), the process is shifted to Step SH-11. In other words, because the buffer accumulation amount does not fall within the margin of the target value and "the buffer accumulation amount>the target value+the margin" is satisfied, that is, the buffer accumulation amount is large, the frequency variation determining unit 102g increases the frequency based on the accumulation amount and the variation per unit time to accelerate the output from the buffer.

Because processing at Step SH-11 to Step SH-13 is the same as the processing at Step SB-10 to Step SB-12 shown in FIG. 4, an explanation thereof will be omitted.

As described above, the present embodiment adjusts the clock frequency based on the variation in the accumulation amount per unit time.

As described above, the present embodiment solves the conventional problem of minute difference in the clock and temporal fluctuation in the network occurring between the transmission side and the reception side. The present embodiment also solves the conventional problem that a buffer needs to be provided to accumulate information for suppression of overflow or underflow caused by jitter or the like.

The present embodiment also solves the conventional problem of delay caused by the temporary accumulation of information in the buffer provided to suppress overflow or underflow. Thus, the present embodiment can reduce a delay time caused by the buffer and transmit information in real-time with the lowest delay in medical telesurgery, for example.

In the present embodiment, an information-transmitting apparatus that transmits information from a transmission side to a reception side may temporarily accumulate the information transmitted from the transmission side in a buffer on the reception side. In the present embodiment, an initial clock may be set based on the accumulation amount in the buffer. In the present embodiment, a target value may be set to minimize transmission delay by monitoring the accumulation amount in the buffer in real-time.

In the present embodiment, a margin may be secured with respect to the target value to prevent a clock frequency from drastically changing with a change in the accumulation amount in the buffer depending on the transmission states. In the present embodiment, an output clock frequency may be controlled such that the buffer accumulation amount falls within the margin.

In the present embodiment, an output timing from the receiving buffer may be adjusted in accordance with the output clock frequency calculated based on the buffer accumulation amount. In the present embodiment, for example, if the buffer accumulation amount is larger than the maximum margin, the clock frequency may be increased, whereas if the buffer accumulation amount is smaller than the minimum margin, the clock frequency may be decreased.

4. Other Embodiments

While the embodiment according to the present invention has been described, the present invention may be embodied in various different embodiments within a range of technical ideas described in the scope of claims besides the embodiment.

All or a part of the processing explained to be automatically performed in the processing explained in the embodiment may be manually performed, and all or a part of the processing explained to be manually performed may be automatically performed with a publicly known method.

Various changes may be made as appropriate, unless otherwise stated, on the processing procedures, the control procedures, the specific names, the information including registration data or parameters of search conditions or the like in each processing, the screen examples, or the database configurations indicated in the specification and the drawings.

As for the information-processing apparatus 100, the components are shown in the figures for functional explanation and are not necessarily configured physically as shown in the figures.

All or any desired part of the processing functions included in each device of the information-processing apparatus 100, specifically of the control unit 102 or the processing functions carried out by the control unit 102, for example, may be provided by a CPU or a computer program interpreted and executed by the CPU. The processing functions may be provided as hardware using wired logic. The computer program is recorded in a non-transitory computer-readable recording medium including programmed instructions to cause a computer to perform the method according to the present invention and is mechanically read by the information-processing apparatus 100 as needed. In other words, the storage unit 106 or the like, such as a ROM and a hard disk drive (HDD), records therein a computer program that cooperates with the OS to issue instructions to the CPU and perform various types of processing. The computer program is loaded and executed on a RAM and cooperates with the CPU to provide a control unit.

The computer program may be stored in an application program server connected to the information-processing apparatus 100 via a desired network 300, and all or a part of the computer program may be downloaded as needed.

The computer program according to the present invention may be stored in a computer-readable recording medium or may be provided as a computer program product. Examples of the "recording medium" include any desired "portable physical medium", such as a memory card, a universal serial bus (USB) memory, a secure digital (SD) card, a flexible disk, a magneto-optical (MO) disk, a ROM, an erasable programmable ROM (EPROM), an electrically erasable programmable ROM (EEPROM), a compact disc read-only memory (CD-ROM), a digital versatile disc (DVD), and a Blu-ray (registered trademark) disc.

The "computer program" is a data processing method written in any desired language and description method and may have any format including a source code and a binary code. The "computer program" is not necessarily configured individually. Examples of the "computer program" include a computer program distributed as a plurality of modules or libraries and a computer program that cooperates with another computer program typified by an OS to execute its function. Each device according to the embodiment may use a well-known configuration and procedure for a specific configuration to read the recording medium, a reading procedure, or an installation procedure after the reading, for example.

Various types of databases or the like (the buffer 106a) stored in the storage unit 106 are storage units including any one or both of a memory device, such as a RAM and a ROM, a fixed disk device, such as a hard disk, a flexible disk, and an optical disk. The storage units may store therein any one or both of various types of computer programs, tables, databases, and files for webpages used for various types of processing and provision of websites, for example.

The information-processing apparatus 100 may be an information-processing terminal like a known personal computer and a known workstation. The information-processing terminal may be connected to any desired peripheral device. The information-processing apparatus 100 may be provided by mounting software (including a computer program and data) to cause the information-processing terminal to execute the method according to the present invention thereon.

Specific aspects of distribution and integration of the apparatus are not limited to that shown in the figures. The whole or a part of the apparatus may be functionally or physically distributed or integrated in any desired unit depending on various types of loads or functional loads. In other words, the embodiment may be provided in an optionally combined manner or a selective manner.

The present invention can minimize (keep minimizing) delay in transmission of information compared with the conventional technologies.

Even when delay is occurred in a transmission path or between devices, the present invention can minimize delay by dynamically changing a clock frequency of output from a buffer in a reception side.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information-processing apparatus comprising:
a central processing unit (CPU) coupled to a memory, the CPU being programmed to:
accumulate received information in a buffer;
monitor a buffer accumulation amount serving as an amount of information accumulated in the buffer;
adjust a clock frequency used to output the information from the buffer based on the monitored buffer accumulation amount;
output the information from the buffer in accordance with the adjusted clock frequency; and
determine a frequency variation for adjusting the clock frequency by determining whether the monitored buffer accumulation amount falls within a margin set between a minimum target value and a maximum target value, wherein
the clock frequency used to output the information from the buffer is adjusted using the frequency variation, and
the CPU further programmed to:
determine whether the buffer accumulation amount in the buffer falls within the margin:
when the buffer accumulation amount falls outside the margin, determine whether the buffer accumulation amount is smaller than the minimum target value or greater than the maximum target value:
when the buffer accumulation amount is smaller than the minimum target value, determine the frequency variation so as to decrease the clock frequency; and
when the buffer accumulation amount is greater than the maximum target value, determine the frequency variation so as to increase the clock frequency.

2. The information-processing apparatus according to claim 1, wherein the CPU is further programmed to determine the frequency variation to adjust the clock frequency by comparing the monitored buffer accumulation amount with the minimum target value and the maximum target value.

3. The information-processing apparatus according to claim 2, wherein the CPU is further programmed to:
set a target value of the buffer accumulation amount based on the monitored buffer accumulation amount, and
set the frequency variation by comparing the monitored buffer accumulation amount and the target value.

4. The information-processing apparatus according to claim 3, wherein the CPU is further programmed to:
set a margin around the target value, and
determine the frequency variation by determining whether the monitored buffer accumulation amount falls within the margin.

5. The information-processing apparatus according to claim 4, wherein the CPU is further programmed to:
set a plurality of margins in stages around the target value, and
upon determining that the monitored buffer accumulation amount falls within a margin of the plurality of margins, determine the frequency variation in stages based on the margin.

6. The information-processing apparatus according to claim 3, wherein the CPU is further programmed to:
acquire a buffer accumulation amount variation per unit time based on a difference between the buffer accumulation amount and the target value, wherein
the frequency variation to adjust the clock frequency is determined based on the buffer accumulation amount variation.

7. The information-processing apparatus according to claim 3, wherein the CPU is further programmed to set the target value of the buffer accumulation amount based on a variation process of the monitored buffer accumulation amount.

8. The information-processing apparatus according to claim 3, wherein the CPU is further programmed to determine the frequency variation based on a difference between the monitored buffer accumulation amount and the target value.

9. The information-processing apparatus according to claim 1, wherein the CPU is further programmed to adjust the clock frequency such that the clock frequency used to output the information from the buffer functionally changes based on the monitored buffer accumulation amount.

10. An output adjustment method comprising:
an accumulating step of accumulating received information in a buffer;
a monitoring step of monitoring a buffer accumulation amount serving as an amount of information accumulated in the buffer;

a frequency adjusting step of adjusting a clock frequency used to output the information from the buffer based on the buffer accumulation amount monitored at the monitoring step;
an information outputting step of outputting the information from the buffer in accordance with the clock frequency adjusted at the frequency adjusting step; and
a frequency variation determining step of determining a frequency variation for adjusting the clock frequency by determining whether the buffer accumulation amount monitored at the monitoring step falls within a margin set between a minimum target value and a maximum target value, wherein
at the frequency adjusting step, the frequency variation is used to adjust the clock frequency for outputting the information from the buffer, and
at the frequency adjusting step, whether the buffer accumulation amount in the buffer falls within the margin is determined:
  when the buffer accumulation amount falls outside the margin, determine whether the buffer accumulation amount is smaller than the minimum target value or greater than the maximum target value:
    when the buffer accumulation amount is smaller than the minimum target value, determine the frequency variation so as to decrease the clock frequency; and
    when the buffer accumulation amount is greater than the maximum target value, determine the frequency variation so as to increase the clock frequency.

11. The output adjustment method according to claim 10, wherein at the frequency variation determining step, the frequency variation is further determined by comparing the buffer accumulation amount monitored at the monitoring step with the minimum target value and the maximum target value.

12. The output adjustment method according to claim 11, further comprising:
a target value setting step of setting a target value of the buffer accumulation amount based on the buffer accumulation amount monitored at the monitoring step, wherein
at the frequency variation determining step, the frequency variation is determined by comparing the buffer accumulation amount monitored at the monitoring step and the target value.

13. The output adjustment method according to claim 12, wherein
at the target value setting step, a margin is further set around the target value, and
at the frequency variation determining step, the frequency variation is further determined by determining whether the buffer accumulation amount monitored at the monitoring step falls within the margin set at the target value setting step.

14. The output adjustment method according to claim 13, wherein
at the target value setting step, a plurality of margins in stages are further set around the target value, and
at the frequency variation determining step, when it is determined that the buffer accumulation amount monitored at the monitoring step falls within a margin of the plurality of margins set at the target value setting step, the frequency variation is determined in stages based on the margin.

15. The output adjustment method according to claim 12, further comprising:
an accumulation amount variation acquiring step of acquiring a buffer accumulation amount variation per unit time based on a difference between the buffer accumulation amount and the target value, wherein
at the frequency variation determining step, the frequency variation to adjust the clock frequency is determined based on the buffer accumulation amount variation.

16. The output adjustment method according to claim 12, wherein at the target value setting step, the target value of the buffer accumulation amount is set based on a variation process of the buffer accumulation amount monitored at the monitoring step.

17. The output adjustment method according to claim 12, wherein at the frequency variation determining step, the frequency variation is determined based on a difference between the buffer accumulation amount monitored at the monitoring step and the target value.

18. The output adjustment method according to claim 10, wherein at the frequency adjusting step, adjustment is performed such that the clock frequency for outputting the information from the buffer functionally changes based on the buffer accumulation amount monitored at the monitoring step.

19. An information-processing apparatus comprising:
a central processing unit (CPU); and
a memory storing programs that, when executed by the CPU, cause the CPU to:
  accumulate information in a buffer, wherein the information is output at a clock frequency;
  monitor a buffer accumulation amount indicating an amount of information accumulated in the buffer;
  set a target value for the buffer accumulation amount;
  set a margin encompassing a target value, the margin being set between a minimum margin value and a maximum margin value, the minimum margin value being set a first predetermined value below the target value, the maximum margin value being set a second predetermined value above the target value;
  determine whether the buffer accumulation amount in the buffer falls within the margin;
  when the buffer accumulation amount is determined to fall within the margin, maintain the clock frequency and output the information from the buffer at the clock frequency; and
  when the buffer accumulation amount is determined to fall outside the margin:
    determine whether the buffer accumulation amount is smaller than the minimum margin value or greater than the maximum margin value;
      when the buffer accumulation amount is smaller than the minimum margin value, reduce the clock frequency and output the information from the buffer at the reduced clock frequency; and
      when the buffer accumulation amount is greater than the maximum margin value, increase the clock frequency and output the information from the buffer at the increased clock frequency.

* * * * *